(12) United States Patent
Morino

(10) Patent No.: US 12,112,005 B2
(45) Date of Patent: Oct. 8, 2024

(54) ELECTROSTATIC CAPACITIVE TOUCH PANEL

(71) Applicant: Sharp Display Technology Corporation, Kameyama (JP)

(72) Inventor: Shinya Morino, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/228,606

(22) Filed: Jul. 31, 2023

(65) Prior Publication Data

US 2024/0069679 A1 Feb. 29, 2024

(30) Foreign Application Priority Data

Aug. 23, 2022 (JP) ................................. 2022-132738

(51) Int. Cl.
*G06F 3/044* (2006.01)
*G06F 3/047* (2006.01)

(52) U.S. Cl.
CPC ............ *G06F 3/0445* (2019.05); *G06F 3/047* (2013.01)

(58) Field of Classification Search
CPC .... G06F 3/0443; G06F 3/04164; G06F 3/041; G06F 3/047; G06F 3/0446; G06F 3/0445
See application file for complete search history.

(56) References Cited

U.S. PATENT DOCUMENTS

2009/0244021 A1* 10/2009 Matsuo ................ G06F 3/0446
345/173
2017/0185187 A1* 6/2017 Nakayama ............ G06F 3/0445

FOREIGN PATENT DOCUMENTS

JP 2009-237673 A 10/2009

* cited by examiner

*Primary Examiner* — Deeprose Subedi
(74) *Attorney, Agent, or Firm* — ScienBiziP, P.C.

(57) ABSTRACT

An electrostatic capacitive touch panel comprises a first substrate; a first electrode extending in a first direction and a first wiring line connected to the first electrode provided on the first substrate; a second substrate; a second electrode extending in a second direction that is perpendicular to the first direction and a second wiring line provided on the second substrate, wherein the first wiring line includes a first extension portion, the second wiring line includes a second extension portion, the second electrode includes: a first capacitance portion overlapping the first electrode in a plan view; and a first connecting portion having a smaller width in the first direction than does the first capacitance portion, and, with respect to the first extension portion, the second extension portion is located in the positive direction where the first connecting portion is adjacent to the first capacitance portion in the second direction.

5 Claims, 12 Drawing Sheets

ELECTROSTATIC CAPACITIVE TOUCH PANEL

FIELD

The present disclosure relates to electrostatic capacitive touch panels.

BACKGROUND

Touch panels are widely used as an input device in various devices equipped with a display device. An electrostatic capacitive touch panel detects a position pointed by, for example, a finger or a pointing stylus through a change in electrostatic capacity. Patent Literature 1 discloses an electrostatic capacitive touch panel that is capable of restraining variations in parasitic capacitance between wiring lines to improve detection sensitivity.

CITATION LIST

Patent Literature

Patent Literature 1
  Japanese Unexamined Patent Application Publication, Tokukai, No. 2009-237673

SUMMARY

Variations in electrostatic capacity pose problems as variations in initial value of the electrostatic capacitive touch panel. The present disclosure has an object to provide an electrostatic capacitive touch panel capable of restraining initial electrostatic capacity value variations.

Solution to the Problems

The present disclosure, in an embodiment thereof, is directed to an electrostatic capacitive touch panel including: a first substrate; a first electrode provided on the first substrate and extending in a first direction; a first wiring line provided on the first substrate and connected to the first electrode; a second substrate provided opposite the first substrate; a second electrode provided on the second substrate and extending in a second direction that is perpendicular to the first direction; and a second wiring line provided on the second substrate and connected to the second electrode, wherein the first wiring line includes a first extension portion, the second wiring line includes a second extension portion, the first extension portion and the second extension portion extend parallel to each other and in a non-parallel direction that is not parallel to the second direction, the second electrode includes: a first capacitance portion at least partially overlapping the first electrode in a plan view; and a first connecting portion adjacent in the second direction to the first capacitance portion in the plan view, the first connecting portion having a smaller width in the first direction than does the first capacitance portion, and the second direction being positive when the first connecting portion is viewed from the first capacitance portion which is adjacent to the first connecting portion, the second extension portion of the second wiring line is located in the positive, second direction from the first extension portion of the first wiring line.

The present disclosure, in an embodiment thereof, provides an electrostatic capacitive touch panel capable of restraining initial electrostatic capacity value variations.

DESCRIPTION OF EMBODIMENTS

Figure 1:
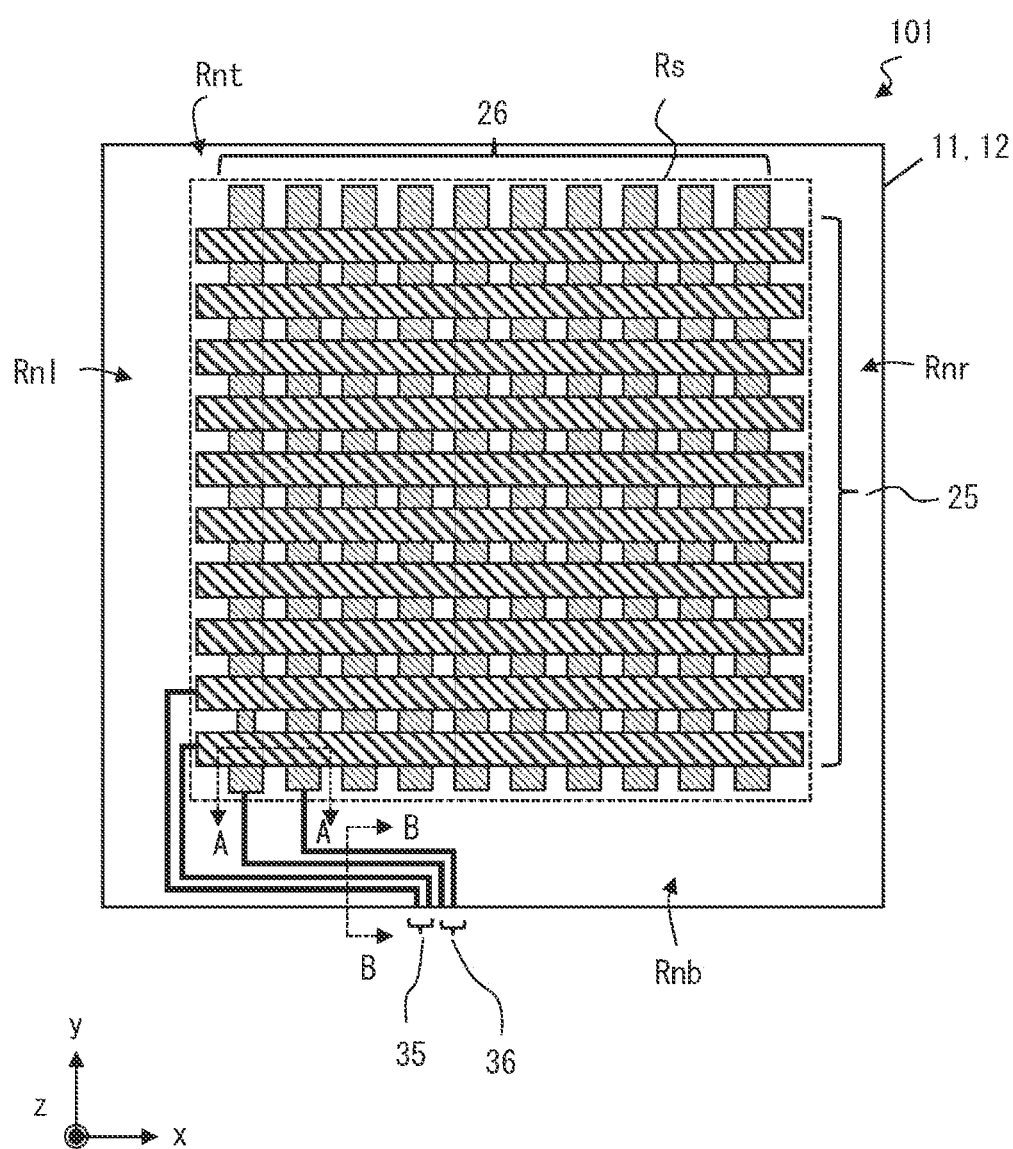
FIG. 1 is a schematic plan view of an exemplary structure of an electrostatic capacitive touch panel in accordance with Embodiment 1, illustrating major components.

The inventor of the present disclosure has analyzed capacitance value variations in a detection region of an electrostatic capacitive touch panel in detail and found that initial capacitance value variations are especially large in particular locations. For example, the inventor has found that there are cases where initial capacitance value variations are large on a corner of a rectangular input area. Large capacitance value variations could render it difficult to determine whether the manufactured electrostatic capacitive touch panel functions as intended or not.

In view of these problems, the inventor of the present disclosure has conceived a novel electrostatic capacitive touch panel.

The following will describe embodiments of the present disclosure with reference to drawings. The present disclosure is not limited to the following description of embodiments and may be redesigned where appropriate in such a manner as to provide the essential features of the present disclosure. Additionally, the same members or those members which have similar functions will be given the same reference numerals across different drawings throughout the following description, and description thereof may not be repeated. Additionally, the members and structures described in the embodiments and variation examples may be combined or altered where appropriate without departing from the technical concept of the present disclosure. For clarity purposes, the drawings to which reference will be made in the following description may show structures in a simplified or schematic form or omit some structural members. The relative dimensions of structural members as they are shown in the drawings may not represent the actual relative dimensions thereof.

Embodiment 1

Figure 2:
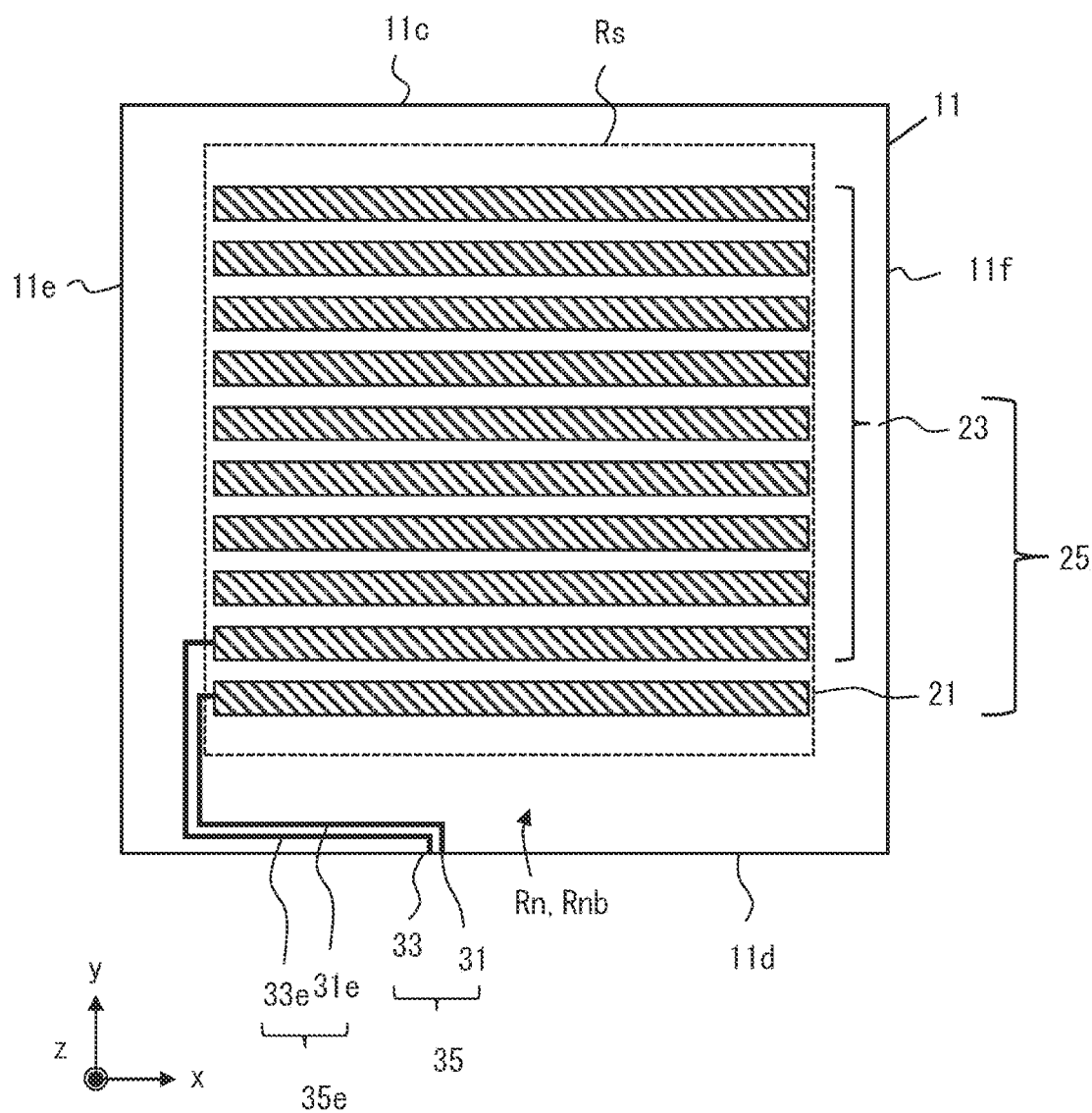
FIG. 2 is a schematic plan view of a structure of a first substrate of the electrostatic capacitive touch panel shown in FIG. 1.
Figure 3:
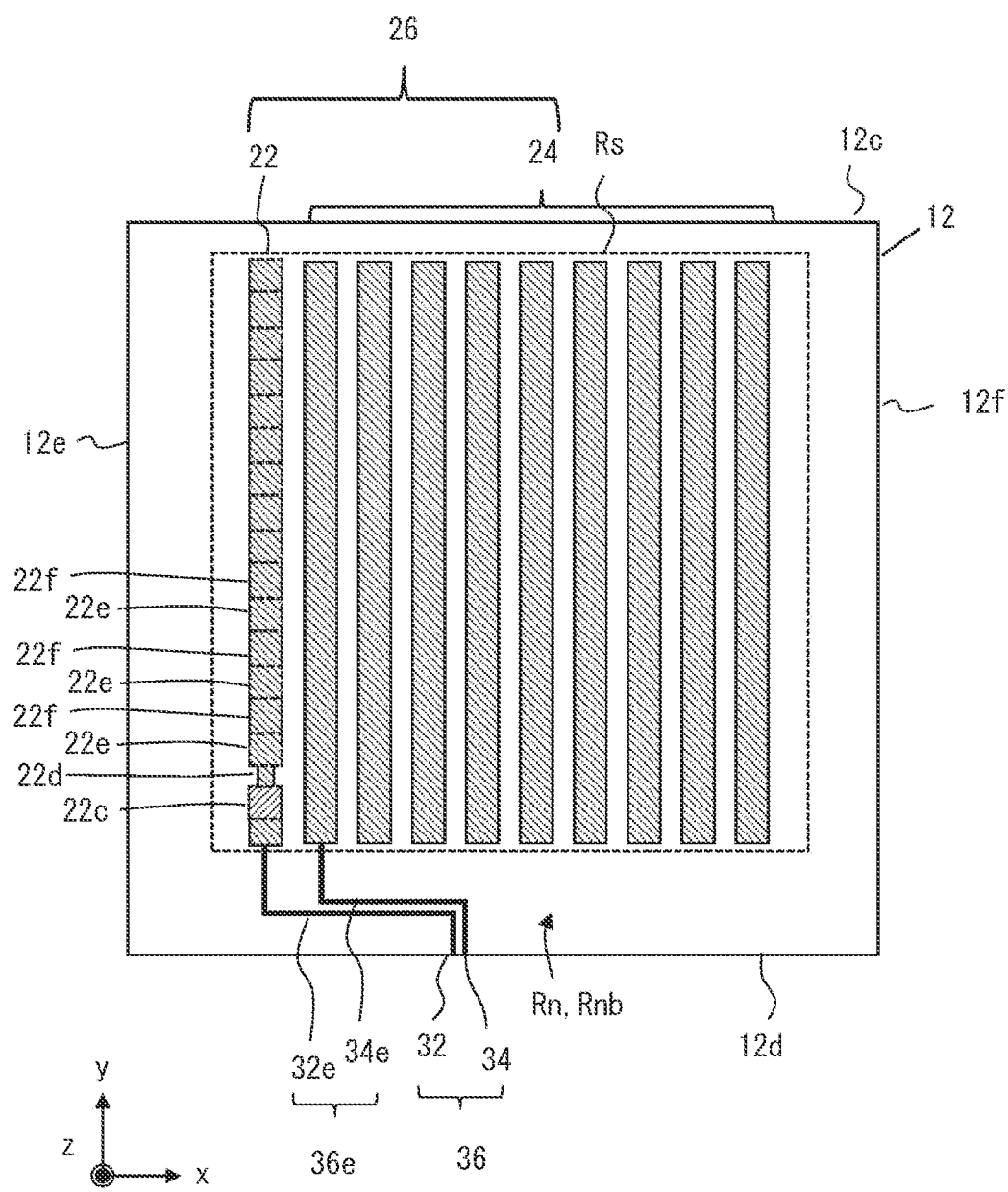
FIG. 3 is a schematic plan view of a structure of a second substrate of the electrostatic capacitive touch panel shown in FIG. 1.
Figure 4:
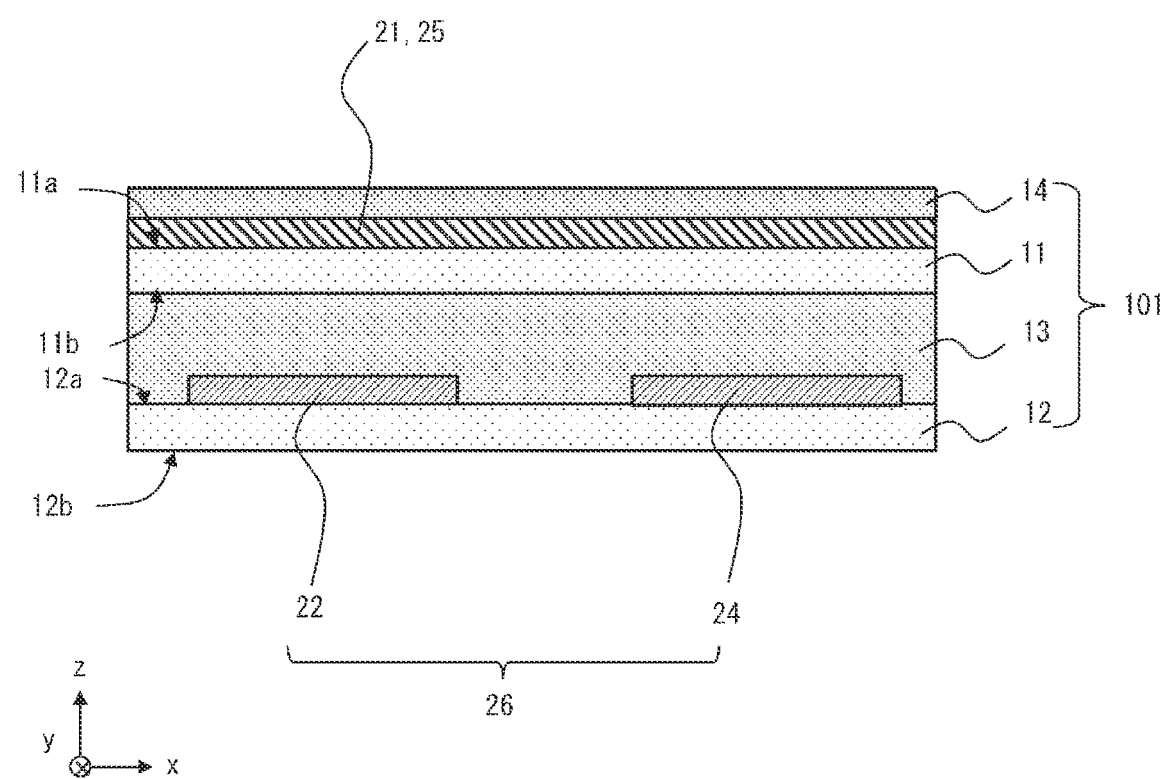
FIG. 4 is a schematic cross-sectional view of the electrostatic capacitive touch panel, taken along line A-A shown in FIG. 1.
Figure 5:
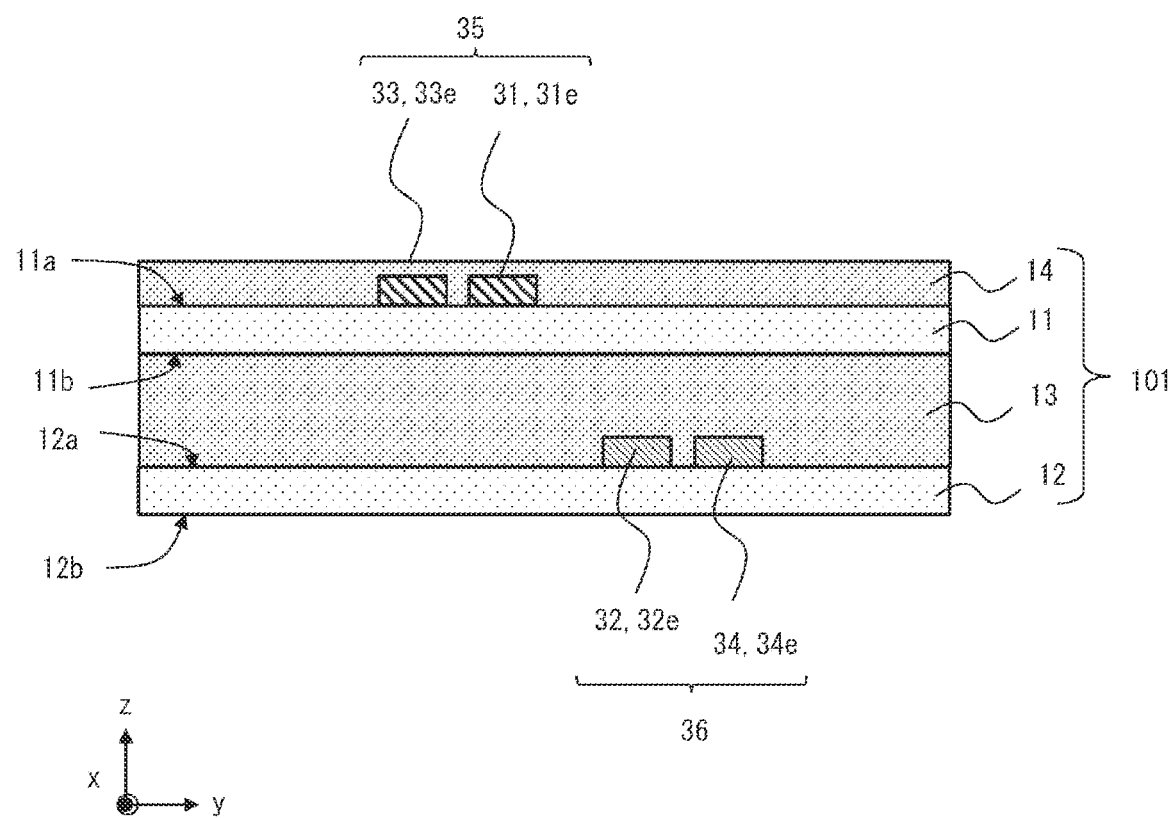
FIG. 5 is a schematic cross-sectional view of the electrostatic capacitive touch panel, taken along line B-B shown in FIG. 1.

A detailed description is given of an electrostatic capacitive touch panel in accordance with the present embodiment. FIG. 1 is a schematic plan view of major components of an electrostatic capacitive touch panel 101 in accordance with the present embodiment. FIG. 2 is a schematic plan view of a structure of a first substrate of the electrostatic capacitive touch panel shown in FIG. 1. FIG. 3 is a schematic plan view of a structure of a second substrate of the electrostatic capacitive touch panel shown in FIG. 1. FIG. 4 is a schematic cross-sectional view of the electrostatic capacitive touch panel 101, taken along line A-A shown in FIG. 1. FIG. 5 is a schematic cross-sectional view of the electrostatic capacitive touch panel 101, taken along line B-B shown in FIG. 1.

The electrostatic capacitive touch panel 101 includes a first substrate 11 and a second substrate 12, a dielectric layer 13, a plurality of drive electrodes 25, a plurality of detection electrodes 26, a plurality of drive electrode-use wiring lines 35, and a plurality of detection electrode-use wiring lines 36.

The first substrate 11 is rectangular and, as shown in FIGS. 4 and 5, shaped like a thin plate having: a first primary face 11a; and a second primary face 11b disposed opposite the first primary face 11a. Similarly, the second substrate 12 is rectangular and shaped like a thin plate having: a first primary face 12a; and a second primary face 12b disposed opposite the first primary face 12a. The first substrate 11 and the second substrate 12 are disposed facing each other. More specifically, the first substrate 11 and the second substrate 12 are disposed so that the second primary face 11b of the first substrate 11 faces the first primary face 12a of the second substrate 12. Note that in FIGS. 2 and 3, the structure of the first substrate 11 and the second substrate 12 is shown in a plan view as viewed from the first primary face 11a and the first primary face 12a, for ease in understanding the relative positions of the electrodes and wiring lines in a plan view.

The first substrate 11 and the second substrate 12 are made of a transparent material such as glass or PET (polyethylene terephthalate) film.

The dielectric layer 13 is disposed between the first substrate 11 and the second substrate 12 and made of an elastic and electrically insulating, transparent material. For example, the dielectric layer 13 may be made of any appropriate transparent polymer material, specifically, a material commercially available in the name of, for example, OCA (optical clear adhesive) or OCR (optical clear resin). The first substrate 11 and the second substrate 12 have: a detection region Rs; and a peripheral region Rn surrounding the detection region in a plan view. The detection region Rs includes therein the drive electrodes 25 and the detection electrodes 26 to detect, for example, the position and/or strength of pressure of a finger or a pointer stick. The peripheral region Rn includes therein the drive electrode-use wiring lines 35 and the detection electrode-use wiring lines 36 for electrically connecting the drive electrodes 25 and the detection electrodes 26 to an external drive circuit and an external detection circuit as will be described later in detail.

The plurality of drive electrodes 25 function as one of the electrodes for retaining electrostatic capacity. The plurality of drive electrodes 25 are disposed on the first primary face 11a of the first substrate 11 (FIG. 4) in the detection region Rs. As shown in FIG. 2, the plurality of drive electrodes 25 extend in the x-axis direction (first direction) and are arranged next to each other in the y-axis direction. As shown in, for example, FIG. 1, the x- and y-axes are defined, for example, by taking the lower right as the origin.

The plurality of drive electrodes 25 include one first electrode 21 and a plurality of third electrodes 23. The first electrode 21 is one of the plurality of drive electrodes 25 arranged next to each other in the y-direction that is the closest to the origin. Each drive electrode 25 has a stripe shape with a constant width in the y-axis direction in the present embodiment. The same description applies to layout pitches in the y-axis direction. The drive electrodes 25 are made of, for example, a transparent conductive material such as ITO.

Referring to FIG. 5, the plurality of drive electrode-use wiring lines 35 are disposed on the first primary face 11a of the first substrate 11 in the peripheral region Rn. The plurality of drive electrode-use wiring lines 35 are connected respectively to the plurality of drive electrodes 25 to apply a drive voltage to the drive electrodes 25 from an external circuit. For this purpose, the drive electrode-use wiring lines 35 have an end thereof connected respectively to the plurality of drive electrodes 25 and the other end thereof drawn out to one of the sides of the rectangular, first substrate 11. In the present embodiment, the other end is drawn out to a neighborhood of the midpoint of one (side 11d) of four sides 11c, 11d, 11e, and 11f that define the profile of the first substrate 11.

The plurality of drive electrode-use wiring lines 35 include: a first wiring line 31 connected to the first electrode 21; and a third wiring line 33 connected to the third electrode 23.

The plurality of drive electrode-use wiring lines 35 include an extension portion 35e extending not parallel to the y-axis direction in a peripheral region Rnb that is adjacent to the side 11d. In other words, the first wiring line 31 includes an extension portion 31e, and the third wiring line 33 includes an extension portion 33e. The extension portion 35e extends parallel to the x-axis direction in the present embodiment.

Although FIG. 2 shows only one third wiring line 33, each third electrode is connected to the third wiring line 33. The plurality of drive electrode-use wiring lines 35 are arranged so as not to intersect with each other on the first substrate 11. Therefore, each portion of the plurality of drive electrode-use wiring lines 35 including the extension portions 35e is disposed parallel to each other. In addition, among the drive electrode-use wiring lines 35, the first wiring line 31 connected to the first electrode 21 is located closest to the detection region Rs side.

Referring to FIGS. 4 and 5, the electrostatic capacitive touch panel 101 may further include a cover layer 14 on the first primary face 11a of the first substrate 11 so as to cover the plurality of drive electrodes 25 and the plurality of drive electrode-use wiring lines 35. The cover layer 14 is made of, for example, resin or glass.

The plurality of detection electrodes 26 function as the other one of the electrodes for retaining electrostatic capacity. The plurality of detection electrodes 26 are disposed on the first primary face 12a of the second substrate 12 (FIG. 4) in the detection region Rs. As shown in FIG. 3, the plurality of detection electrodes 26 extend in the y-axis direction (second direction) and are arranged next to each other in the x-axis direction. The detection electrodes 26 are also made of, for example, a transparent conductive material such as ITO.

The plurality of detection electrodes 26 include one second electrode 22 and a plurality of fourth electrodes 24. The second electrode 22 is one of the plurality of detection electrodes 26 arranged next to each other in the x-direction that is the closest to the origin. The second electrode 22 includes: a first capacitance portion 22c; and a first connecting portion 22d that is adjacent to the first capacitance portion 22c in the y-direction.

In a plan view, the first capacitance portion 22c at least partially overlaps the first electrode 21. As will be described later in detail, when the drive electrodes 25 and the detection electrodes 26 are not displaced during the manufacture, that is, under the conditions that there are zero alignment errors in design, the first capacitance portion 22c entirely overlaps the first electrode 21.

The first connecting portion 22d is adjacent to the first capacitance portion 22c. In the present embodiment, the first connecting portion 22d is disposed closer to the positive end of the y-axis than is the first capacitance portion 22c (positive direction of the y-axis). The first connecting portion 22d has a smaller width in the x-direction than does the first capacitance portion 22c. Both the first connecting portion 22d and the first capacitance portion 22c are rectangular in the present embodiment.

The second electrode 22 further includes a plurality of third capacitance portions 22e and a plurality of third connecting portions. In a plan view, the plurality of third capacitance portions 22e at least partially overlap the third electrodes 23. Similarly to the first capacitance portion 22c, when the drive electrodes 25 and the detection electrodes 26 are not displaced during the manufacture, that is, under the conditions that there are zero alignment errors in design, the third capacitance portions 22e entirely overlap the third electrodes 23.

Third connecting portions 22f are adjacent to the third capacitance portions 22e. In the present embodiment, the third connecting portions 22f are disposed closer to the positive end of the y-axis than are the third capacitance portions 22e. The third connecting portions 22f have the same width in the x-direction as does the third capacitance portions 22e. In addition, the third connecting portions 22f and the third capacitance portions 22e are all rectangular. Therefore, the plurality of third capacitance portions 22e and the plurality of third connecting portions 22f are formed like integral strips with a constant width.

Referring to FIG. 5, the plurality of detection electrode-use wiring lines 36 are disposed on the first primary face 12a of the second substrate 12 in the peripheral region Rn. The plurality of detection electrode-use wiring lines 36 are connected respectively to the plurality of detection electrodes 26 and further to an external detection circuit. For this purpose, the detection electrode-use wiring lines 36 have an end thereof connected respectively to the plurality of detection electrodes 26 and the other end thereof drawn out to one of the sides of the rectangular, second substrate 12. In the present embodiment, the other end is drawn out to a neighborhood of the midpoint of a side 12d, similarly to the drive electrode-use wiring line 35.

The plurality of detection electrode-use wiring lines 36 include: a second wiring line 32 connected to the second electrode 22; and a fourth wiring line 34 connected to the fourth electrode 24.

The plurality of detection electrode-use wiring lines 36 include an extension portion 36e extending not parallel to the y-axis direction in the peripheral region Rnb that is adjacent to the side 11d. In other words, the second wiring line 32 includes an extension portion 32e, and the fourth wiring line 34 includes an extension portion 34e. The extension portion 36e extends parallel to the x-axis direction in the present embodiment.

Although FIG. 3 shows only one fourth wiring line 34, each fourth electrode 24 is connected to the fourth wiring line 34. The plurality of detection electrode-use wiring lines 36 are arranged so as not to intersect with each other on the second substrate 12. Therefore, each portion of the plurality of detection electrode-use wiring lines 36 including the extension portions 36e is disposed parallel to each other. In addition, among the detection electrode-use wiring lines 36, the extension portion of the second wiring line 32 connected to the second electrode 22 is located closest to the side 12d.

The plurality of drive electrode-use wiring lines 35 and the plurality of detection electrode-use wiring lines 36 may be made of either a transparent conductive material such as ITO or a metal. When the drive electrode-use wiring lines 35 and the detection electrode-use wiring lines 36 are made of a transparent conductive material, the drive electrode-use wiring lines 35 and the detection electrode-use wiring lines 36 may be formed integral to the drive electrodes 25 and the detection electrodes 26 respectively.

Referring to FIGS. 4 and 5, the first substrate 11 and the second substrate 12 are disposed facing each other across the dielectric layer 13. Hence, the drive electrodes 25 and the detection electrodes 26 are disposed overlapping each other in the thickness direction of the electrostatic capacitive touch panel 101. As will be described later in detail, the drive electrode-use wiring lines 35 and the detection electrode-use wiring lines 36 are not disposed so as to overlap each other in the thickness direction of the electrostatic capacitive touch panel 101. The extension portion 32e of the second wiring line 32 is disposed closer to the positive end of the y-axis than is the extension portion 31e of the first wiring line 31 (positive direction of the y-axis).

A description is given next of reasons why conventional electrostatic capacitive touch panels have initial capacitance value variations whereas the electrostatic capacitive touch panel 101 in accordance with the present embodiment can restrain initial capacitance value variations.

As described in Patent Literature 1, since the drive electrode-use wiring lines and the detection electrode-use wiring lines have a length that change depending on the location of the electrode connected to these wiring lines, the parasitic capacitance value can differ among wiring lines. However, if the wiring pattern is fixed, the length of each wiring line is unlikely to vary in the manufacture of the electrostatic capacitive touch panel. In addition, since the plurality of drive electrode-use wiring lines are simultaneously formed using the same mask, the pitches of the plurality of drive electrode-use wiring lines are also unlikely to vary. Therefore, the parasitic capacitance generated between the plurality of drive electrode-use wiring lines is also unlikely to change.

In contrast, since the drive electrode-use wiring lines and the detection electrode-use wiring lines are supported by different substrates, an error can occur when the drive electrode-use wiring lines and the detection electrode-use wiring lines are aligned to combine the two substrates. Therefore, the parasitic capacitance generated between the drive electrode-use wiring lines and the detection electrode-use wiring lines varies by the manufacture of the electrostatic capacitive touch panel. Such an alignment error can occur in both the x-axis direction and the y-axis direction.

The drive electrode-use wiring lines and the detection electrode-use wiring lines are located close to each other in a region where a terminal is provided to connect these wiring lines to an external circuit. In the present embodiment, the drive electrode-use wiring lines and the detection electrode-use wiring lines are located close to each other in the peripheral region Rnb, which is a peripheral region adjacent to the side 11d and the side 12d. When the electrostatic capacitive touch panel 101 is disposed on a screen of a liquid crystal display device, the peripheral region is preferably small. In addition, taking into consideration that the parasitic capacitance increases with a longer wiring line, the peripheral region Rnb preferably has a shorter length in the y-direction than in the x-direction as shown in FIG. 1. In other words, the drive electrode-use wiring lines and the detection electrode-use wiring lines each have a longer length in the x-axis direction than in the y-axis direction in the peripheral region Rnb. It is therefore understood that the parasitic capacitance generated between the drive electrode-use wiring lines and the detection electrode-use wiring lines varies with a change in the distance between the x-direction-wise extension portions of the wiring lines.

In addition, the drive electrode-use wiring lines and the detection electrode-use wiring lines are preferably disposed so as not to overlap each other in a plan view, in order to restrain parasitic capacitance between the drive electrode-use wiring lines and the detection electrode-use wiring lines as much as possible. In such a case, those extension portions of the drive electrode-use wiring lines and the detection electrode-use wiring lines that are located closest to each other are the extension portion of the first wiring line connected to the first electrode of the drive electrode and the extension portion of the second wiring line connected to the second electrode of the detection electrode, the first electrode and the second electrode being the two electrodes that form a capacitance on a corner of the detection region Rs.

Figure 6:
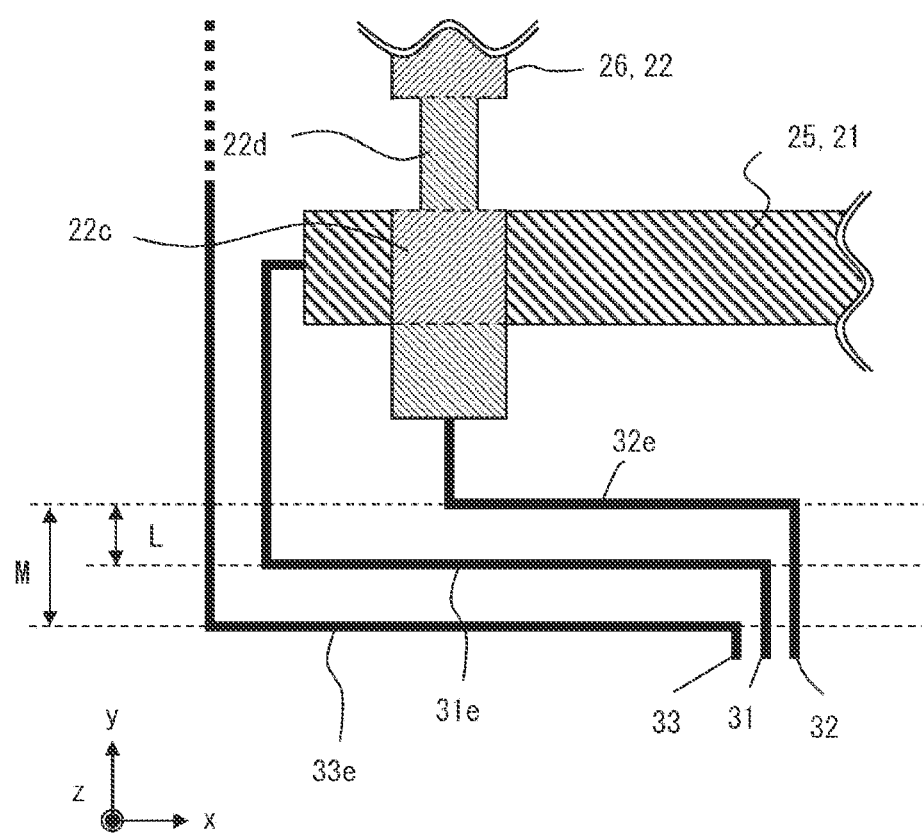
FIG. 6 is a schematic illustration of a displacement of an electrode and a wiring line during manufacture of the electrostatic capacitive touch panel in accordance with Embodiment 1.

FIG. 6 shows the locations of the first electrode 21 and the first wiring line 31 of the drive electrode 25 and the second electrode 22 and the second wiring line 32 of the detection electrode 26 when the first substrate 11 carrying thereon the drive electrodes 25 and the second substrate 12 carrying thereon the detection electrodes 26 are disposed in designed locations with no displacement. The first capacitance portion 22c of the second electrode 22 entirely overlaps the first electrode 21 in a plan view. Under these circumstances, the capacitance of the detection portion generated by the overlapping of the first electrode 21 and the second electrode 22 is denoted by Ct, the parasitic capacitance generated by the extension portion 31e of the first wiring line 31 and the extension portion 32e of the second wiring line 32 is denoted by Cp, and the distance between the extension portion 31e of the first wiring line 31 and the extension portion 32e of the second wiring line 32 is denoted by L.

Figure 7:
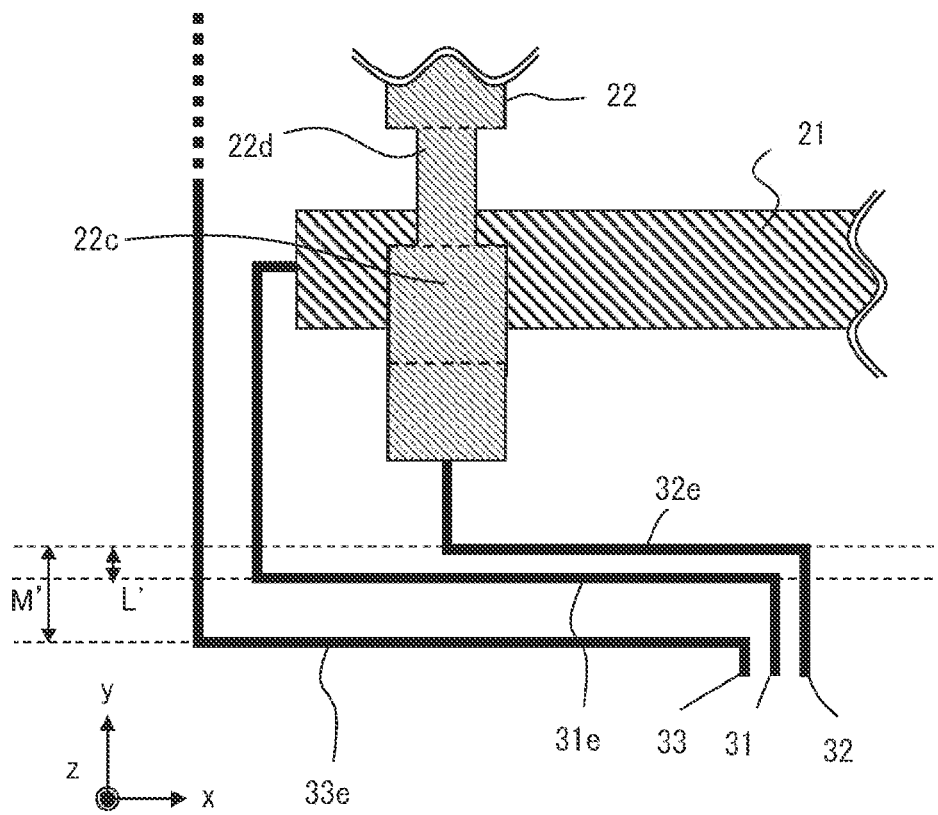
FIG. 7 is a schematic illustration of a displacement of an electrode and a wiring line during manufacture of the electrostatic capacitive touch panel in accordance with Embodiment 1.

FIG. 7 illustrates the second electrode 22 being displaced toward the negative end of the y-axis relative to the first electrode 21. This displacement renders the distance between the extension portion 31e of the first wiring line 31 and the extension portion 32e of the second wiring line 32 equal to L', which is smaller than distance L (L'<L). Therefore, parasitic capacitance Cp' that is generated by the extension portion 31e of the first wiring line 31 and the extension portion 32e of the second wiring line 32 is larger than parasitic capacitance Cp (Cp'>Cp).

In contrast, the displacement causes the first electrode 21 to overlap a part of the first capacitance portion 22c of the second electrode 22 and a part of the first connecting portion 22d. Since the width of the first connecting portion 22d in the x-axis direction is shorter than the width of the first capacitance portion 22c in the x-axis direction, capacitance Ct' generated by the overlapping of the first electrode 21 and the second electrode 22 at this time is smaller than Ct (Ct'<Ct).

As described here, regarding the y-axis, the first connecting portion 22d is disposed closer to the positive end than is the first capacitance portion 22c, and the extension portion 32e of the second wiring line 32 is disposed closer to the positive end than is the extension portion 31e of the first wiring line 31. In other words, since the first connecting portion 22d and the extension portion 32e of the second wiring line 32 are disposed on the same side of the first capacitance portion 22c and the extension portion 31e of the first wiring line 31 respectively in the y-axis direction, detection portion capacitance Ct decreases with an increase in parasitic capacitance Cp due to the displacement. As a result, initial capacitance value variations can be restrained.

If Ct+Cp=Ct'+Cp', the increases in the parasitic capacitance due to the displacement can be completely canceled out by decreases in the capacitance of the detection portion. However, even if the increases in the parasitic capacitance and the decreases in the capacitance of the detection portion are not completely canceled out, the effect of restraining initial value variations caused by an increase in parasitic capacitance can be achieved.

After the extend to which the initial value variations are to be restrained is determined, the width of the first capacitance portion 22c in the x-axis direction can be obtained by calculation using the values of, for example, the substance and thickness of the dielectric layer 13, the total length of the first wiring line 31 and the second wiring line 32, the length of the extension portions of the first wiring line 31 and the second wiring line 32, the distance between the first wiring line 31 and the second wiring line 32, and the resistance of the first wiring line 31 and the second wiring line 32.

Note that as shown in FIG. 6, in a design where a zero displacement is defined as a condition where the first capacitance portion 22c of the second electrode 22 is entirely overlapping the first electrode 21, if the second electrode 22 is displaced toward the positive end of the y-axis relative to the first electrode 21, parasitic capacitance Cp decreases, whereas detection portion capacitance Ct stays unchanged. Therefore, the layout of the first electrode 21 and the second electrode 22 shown in FIG. 6 is suited particularly when the second electrode 22 can possibly be displaced only toward the negative end of the y-axis relative to the first electrode 21.

When the second electrode 22 can possibly be displaced toward both the negative and positive ends of the y-axis relative to the first electrode 21, for example, the layout shown in FIG. 7, that is, a design needs only to be carried out where a zero displacement is defined as a condition where a part of the first capacitance portion 22c of the second electrode and a part of the first connecting portion 22d overlap the first electrode 21. Here, if the second electrode 22 is displaced toward the negative end of the y-axis relative to the first electrode 21, parasitic capacitance Cp increases, and detection portion capacitance Ct decreases. In addition, if the second electrode 22 is displaced toward the positive end of the y-axis relative to the first electrode 21, parasitic capacitance Cp decreases, and detection portion capacitance Ct increases. Therefore, initial capacitance value variations can be restrained no matter in which direction the second electrode 22 is displaced relative to the first electrode 21.

Note that as shown in FIG. 2, the drive electrodes 25 include the plurality of third electrodes 23 as well as the first electrode 21. Therefore, the parasitic capacitance generated between the third wiring line 33 connected to the plurality of third electrodes 23 and the second wiring line 32 can vary due to a displacement between the first substrate 11 and the second substrate 12.

However, as shown in FIG. 7, distance M' between the extension portion 33e of the third wiring line 33 connected to the third electrodes 23 and the extension portion 32e of the second wiring line 32 is larger than distance L' between the extension portion 31e of the first wiring line 31 and the extension portion 32e of the second wiring line 32. Although FIG. 7 shows only one third wiring line 33, this relationship is satisfied in relation to any third wiring line 33 connected to the plurality of third electrodes 23. Since the parasitic capacitance between extension portions of wiring lines is inversely proportional to the distance between the extension portions, among the drive electrodes 25, the initial value of the parasitic capacitance generated between the third wiring line 33 connected to the plurality of third electrodes 23 and the second wiring line 32 and the variations thereof are smaller than the above-described parasitic capacitance generated between the first wiring line 31 and the second wiring line 32.

Likewise, the detection electrodes 26 include the plurality of fourth electrodes 24 as well as the second electrode 22. However, the initial value of the parasitic capacitance between the fourth wiring line 34 connected to the plurality of fourth electrodes 24 and the first wiring line 31 and the variations thereof are small.

Therefore, it is understood that the initial value variations of the parasitic capacitance attributable to an alignment error of the two substrates during the manufacture of the electrostatic capacitive touch panel 101 are effectively restrained by controlling, through the above-described structure, the parasitic capacitance generated between the first wiring line 31 of the drive electrode-use wiring line 35 and the second wiring line 32 of the detection electrode-use wiring line 36.

Embodiment 2

Figure 8:
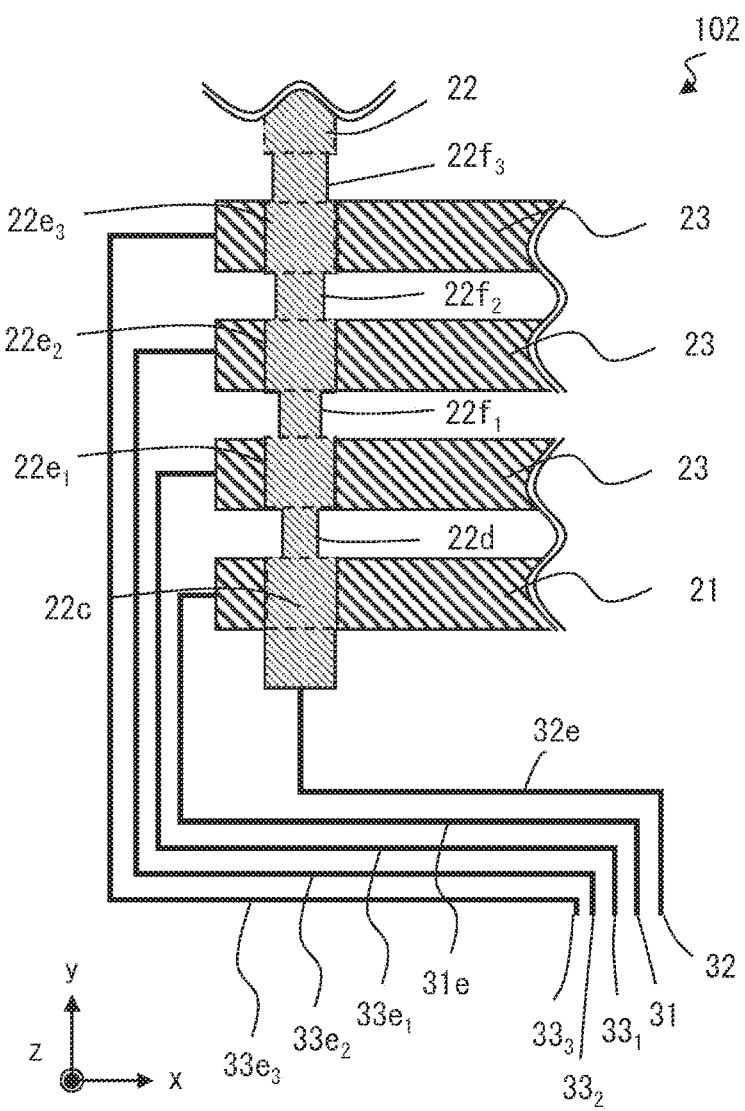
FIG. 8 is a schematic plan view of an exemplary structure of an electrostatic capacitive touch panel in accordance with Embodiment 2, illustrating some major components.

A detailed description is given of an electrostatic capacitive touch panel in accordance with the present embodiment. FIG. 8 is a schematic plan view of some major components of an electrostatic capacitive touch panel 102 in accordance with the present embodiment. The electrostatic capacitive touch panel in accordance with the present embodiment differs from the first embodiment in that at least one of the plurality of third connecting portions 22f of the second electrode 22 has a width in the x-axis direction that is smaller than the width of the third capacitance portions in the x-axis direction and that is larger than the width of the first connecting portion 22d in the x-axis direction.

Referring to FIG. 8, the plurality of third capacitance portions 22e and the third connecting portions are designated as the third capacitance portions $22e_1$, $22e_2$, $22e_3$ ... and as the third connecting portions $22f_1$, $22f_2$, $22f_3$ ... sequentially from the one close to the first connecting portion 22d. Additionally, the extension portions of the third wiring lines 33 are designated as the extension portions $33e_1$, $33e_2$, $33e_3$ ... sequentially from the one close to the extension portion 31e of the first wiring line 31. In the embodiment shown in FIG. 8, the width of the third connecting portions $22f_1$, $22f_2$, and $22f_3$ is smaller than the width of the third capacitance portions in the x-axis direction and larger than the width of the first connecting portion 22d in the x-axis direction respectively. In addition, the width of the third connecting portion $22f_1$ is smaller than the width of the third connecting portion $22f_2$, and the width of the third connecting portion $22f_2$ is smaller than the width of the third connecting portion $22f_3$.

When the layout shown in FIG. 8 is a layout where the displacement between the drive electrode 25 and the detection electrode 26 is designed to be zero, the capacitances of the detection portions generated by the overlapping of the plurality of third electrodes 23 and the first electrode 21 are designated as $Ct_1$, $Ct_2$, $Ct_3$ ... respectively, which are all equal to the value of Ct. In contrast, since the extension portions $33e_1$, $33e_2$, $33e_3$ ... of the plurality of third wiring lines 33 are increasingly distanced from the extension portion 32e of the second wiring line 32 in this order, parasitic capacitances $Cp_1$, $Cp_2$, $Cp_3$ generated by the extension portions $33e_1$, $33e_2$, $33e_3$ ... of the third wiring line 33 and the extension portion 32e of the second wiring line 32 are increasingly smaller in this order.

Figure 9:
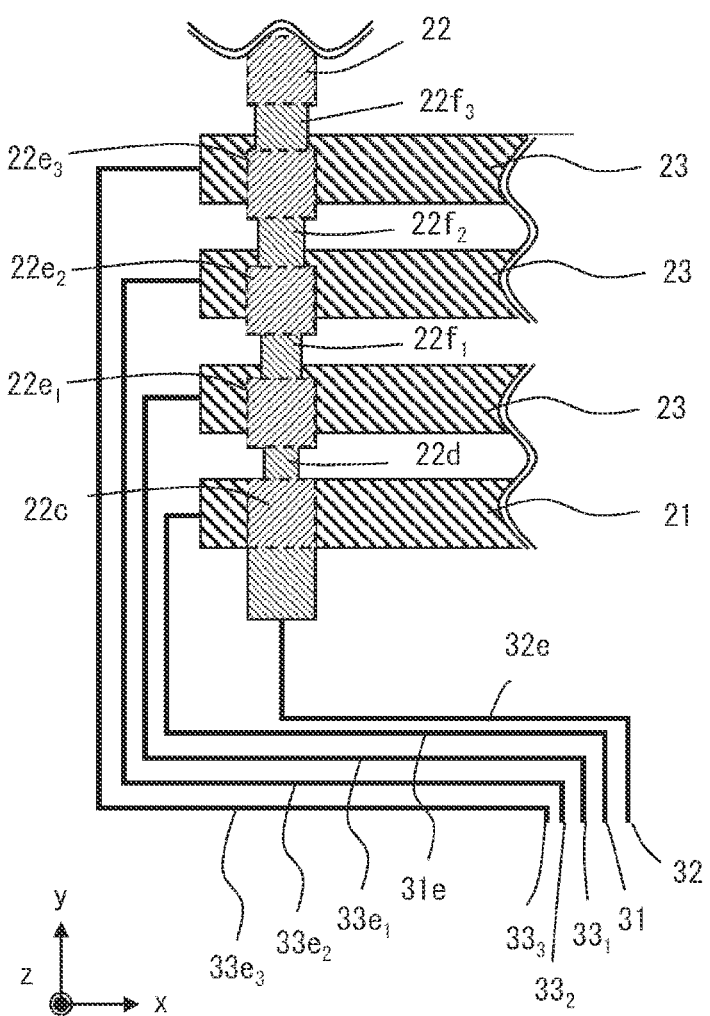
FIG. 9 is a schematic illustration of a displacement of an electrode and a wiring line during manufacture of the electrostatic capacitive touch panel in accordance with Embodiment 2.

FIG. 9 illustrates the second electrode 22 being displaced toward the negative end of the y-axis relative to the first electrode 21 and the third electrode 23. As described in Embodiment 1, an increase from Cp to Cp' of the parasitic capacitance of the first wiring line 31 due to a displacement causes the initial capacitance value variations, however, the initial capacitance value variations are restrained by a decrease in the capacitance of the detection portion from Ct to Ct'.

Likewise, in the extension portions $33e_1$, $33e_2$, $33e_3$ ... of the third wiring line 33, the parasitic capacitance increases to $Cp_1'$, $Cp_2'$, and $Cp_3'$. However, since the distances from the extension portion 32e of the second wiring line 32 to the extension portions $33e_1$, $33e_2$, $33e_3$ ... are greater than the distance from the extension portion 32e of the second wiring line 32 to the extension portion 31e of the first wiring line 31, increases in the parasitic capacitance are smaller.

In correspondence to this, due to a displacement, the plurality of third electrodes 23 are caused to overlap parts of the third connecting portions $22f_1$, $22f_2$, $22f_3$ respectively, and the capacitance of the detection portions are rendered equal to $Ct_1'$, $Ct_2'$, $Ct_3'$ .... Since the width of the third connecting portions $22f_1$, $22f_2$, and $22f_3$ in the x-axis direction is smaller than the width of the third capacitance portions $22e_1$, $22e_2$, and $22e_3$ ... in the x-axis direction and larger than the width of the first connecting portion 22d in the x-axis direction, $Ct_1'$, $Ct_2'$, $Ct_3'$ ... are larger than Ct', and the decreases in the capacitance of the detection portions are smaller than the decreases in the capacitance of the detection portions of the first wiring lines. Therefore, this structure can reduce the capacitance of the detection portions in accordance with the position of the plurality of third electrodes 23 and restrain the initial capacitance value variations generated by an increase in the parasitic capacitance.

Figure 10:
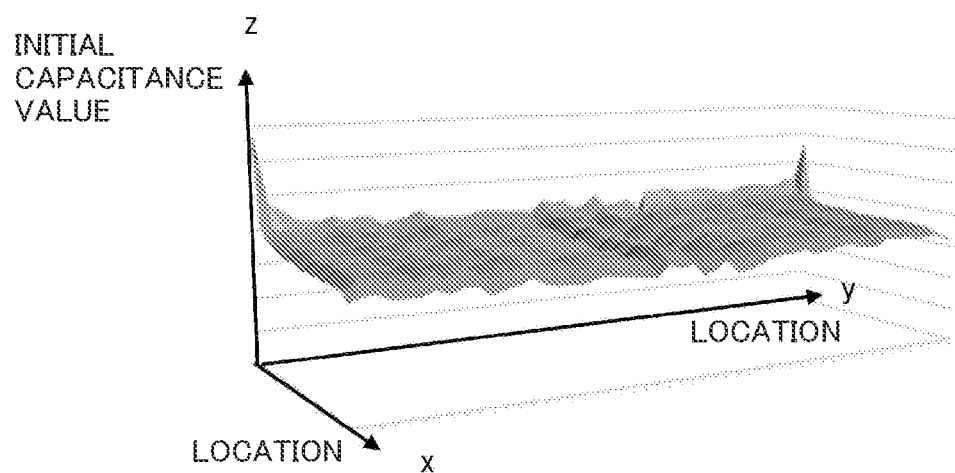
FIG. 10 is an example of results of calculating initial electrostatic capacity value variations of a conventional electrostatic capacitive touch panel.

Note that in the example shown in FIGS. 9 and 10, the width of the third connecting portions $22f_1$, $22f_2$, and $22f_3$ in the x-axis direction is smaller than the width of the third capacitance portions in the x-axis direction. However, the width of at least one of the third connecting portions in the x-axis direction needs only to be smaller than the width of the third capacitance portions in the x-axis direction because the parasitic capacitance generated by the extension portion 32e of the second wiring line 32 and the extension portion 33e of the third wiring line 33 decreases with an increase in the distance between these wiring lines, and the changes in the parasitic capacitance due to a displacement also decreases with such an increase.

In addition, as described in Embodiment 1, when the second electrode 22 can be possibly displaced toward both the negative and positive ends of the y-axis relative to the first electrode 21, for example, the layout shown in FIG. 9, that is, a design needs only to be carried out where a zero displacement is defined as a condition where the first electrode 21 overlaps a part of the first capacitance portion 22c of the second electrode and a part of the first connecting portion 22d, the plurality of third electrodes 23 overlap parts of the third capacitance portions $22e_1$, $22e_2$, $22e_3$ . . . and parts of the third connecting portions $22f_1$, $22f_2$, and $22f_3$ respectively.

Examples of the Disclosure

Figure 11:
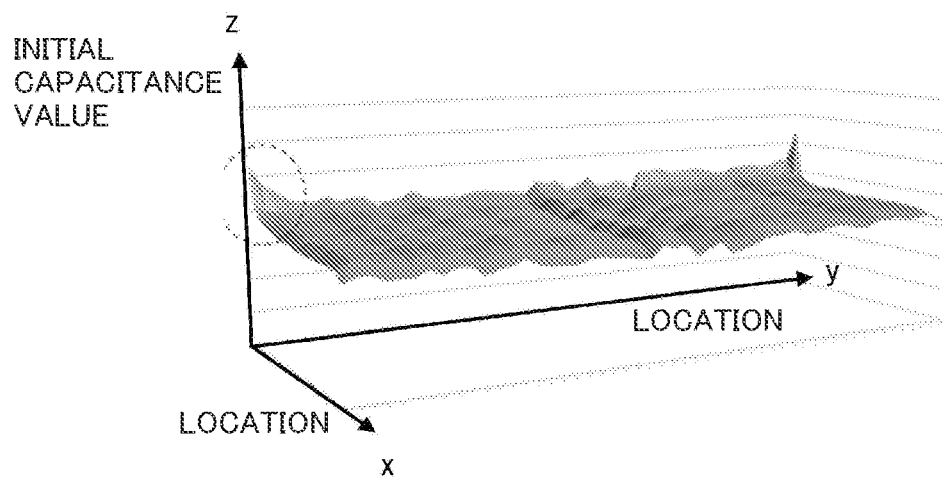
FIG. 11 is an example of results of calculating initial electrostatic capacity value variations of the electrostatic capacitive touch panel in accordance with Embodiment 1.

Results of calculating initial capacitance value variations in a conventional touch panel and a touch panel in accordance with Embodiment 1 are shown. FIG. 10 represents a calculation example for a conventional touch panel, and FIG. 11 represents a calculation example for the touch panel in accordance with Embodiment 1. The conventional touch panel differs from the touch panel in accordance with Embodiment 1 in that the second electrode 22 has the same shape as the fourth electrode. In these figures, the x- and y-axes are taken in the same directions as in, for example, FIG. 1. The z-axis represents an initial capacitance value. As shown in FIG. 10, in the conventional touch panel, the initial capacitance value variation is large approximately at 17% in particular locations, for example, in the detection portion that is closest to the origin. In contrast, as shown in FIG. 11, in the touch panel in accordance with Embodiment 1, the initial capacitance value variation of the detection portion that is closest to the origin is restrained approximately to 11%.

It is thus understood that the touch panel in accordance with Embodiment 1 is capable of effectively restraining the parasitic capacitance variations caused by variations in aligning electrodes during manufacture, thereby reducing initial capacitance value variations.

OTHER EMBODIMENTS

The electrostatic capacitive touch panel in accordance with the present disclosure is not limited to the foregoing embodiments and may be varied in various manners. For example, in the foregoing embodiments, the drawings show that the wiring lines connected to the drive electrodes and the detection electrodes are structured so as to be connected to terminals outside the bottom side of the rectangular substrate in the touch panel. However, the terminals for connecting the wiring lines to an external circuit may be located, for example, on the top side of the rectangular substrate or on the left or right side thereof. In such cases, although the initial capacitance value variation in the detection portion can be large in different locations, the initial capacitance value variation is large in the locations that are closest to one of the four corners of the detection region in any case. Therefore, the drive and detection electrodes that are adjacent to the corner where the initial capacitance value variation is the largest are the first electrode and the second electrode.

Figure 12:
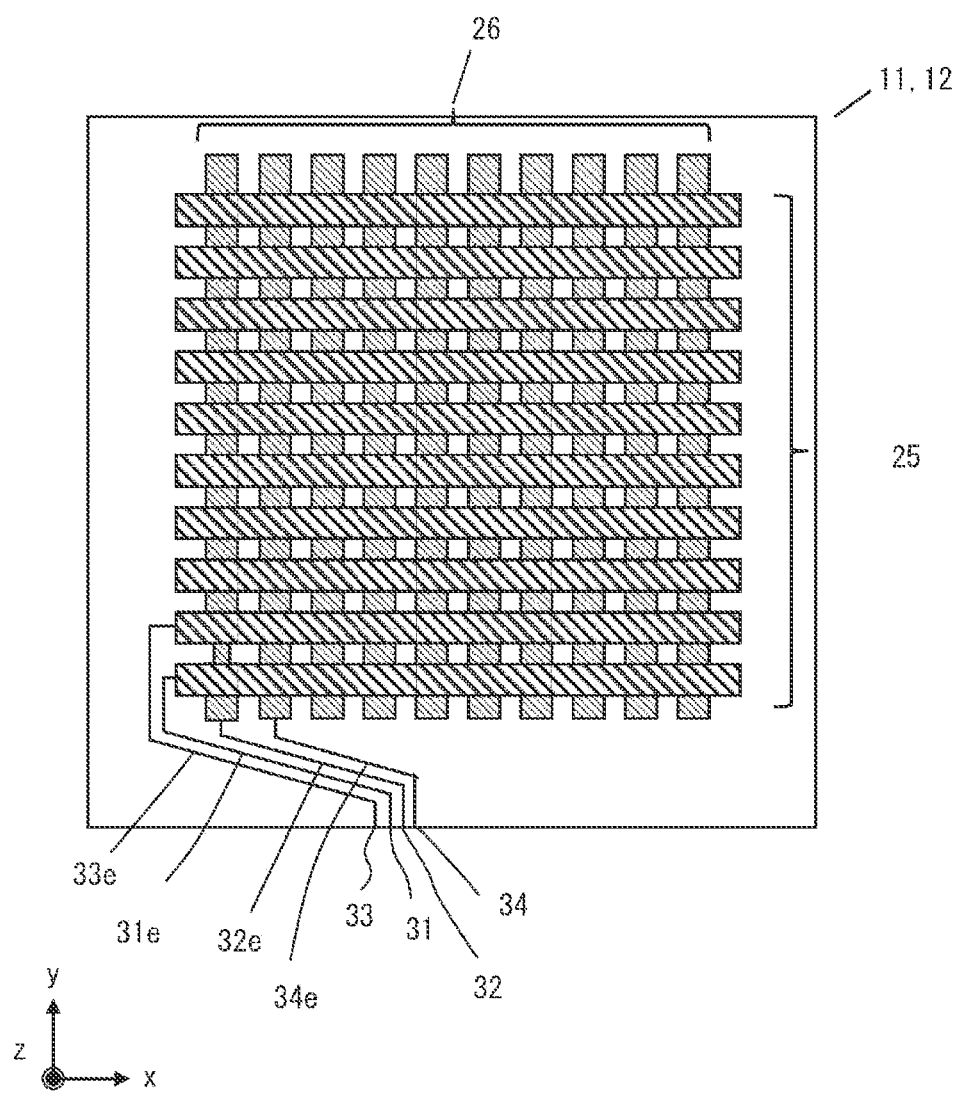
FIG. 12 is a schematic plan view of a structure of an electrostatic capacitive touch panel in accordance with a variation example.

In addition, as shown in FIG. 12, the extension portion 31e of the first wiring line 31, the extension portion 32e of the second wiring line 32, the extension portion 33e of the third wiring line 33, and the extension portion 34e of the fourth wiring line 34 do not necessarily extend parallel to the x-axis. Here, the inclinations of the extension portions are preferably less than or equal to 45° with respect to the x-axis.

Figure 13:
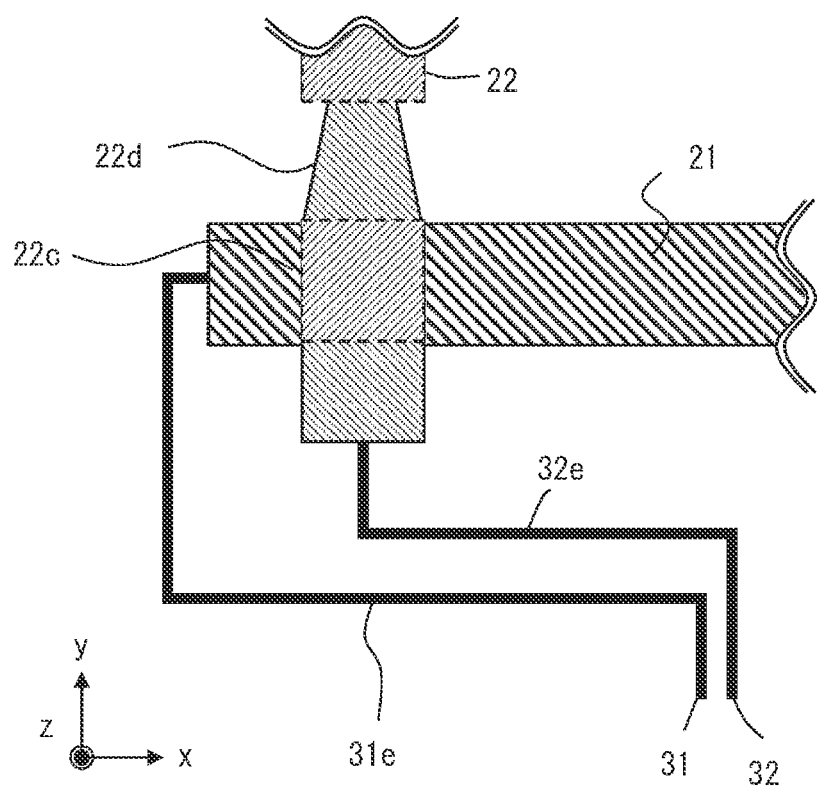
FIG. 13 is a schematic plan view of an exemplary structure of an electrostatic capacitive touch panel in accordance with a variation example, illustrating some major components.

In addition, the width of the first connecting portion 22d in the x-axis direction is not necessarily constant along the y-axis direction. For example, as shown in FIG. 13, the width of the first connecting portion 22d in the x-axis direction may decrease as moving from the boundary with the first capacitance portion 22c toward the positive end of the y-axis.

In addition, the electrostatic capacitive touch panel in accordance with the present disclosure may take any one of various forms, including in-cell types, on-cell types, and in-cell types. In addition, the electrostatic capacitive touch panel in accordance with the present disclosure may include electrodes other than the drive electrodes and the detection electrodes.

In addition, either the drive electrodes or the detection electrodes may be disposed on the first substrate. The drive electrodes, the detection electrodes, the drive electrode-use wiring lines, and the detection electrode-use wiring lines may be disposed on the second primary face 11b of the first substrate or on the second primary face 12b of the second substrate, provided that the locations of, for example, a finger and a pointer stick can be properly detected.

The electrostatic capacitive touch panel in accordance with the present disclosure may be described as follows.

An electrostatic capacitive touch panel in accordance with a first structure includes: a first substrate; a first electrode provided on the first substrate and extending in a first direction; a first wiring line provided on the first substrate and connected to the first electrode; a second substrate provided opposite the first substrate; a second electrode provided on the second substrate and extending in a second direction that is perpendicular to the first direction; and a second wiring line provided on the second substrate and connected to the second electrode, wherein the first wiring line includes a first extension portion, the second wiring line includes a second extension portion, the first extension portion and the second extension portion extend parallel to each other and in a non-parallel direction that is not parallel to the second direction, the second electrode includes: a first capacitance portion at least partially overlapping the first electrode in a plan view; and a first connecting portion adjacent in the second direction to the first capacitance portion in the plan view, the first connecting portion having a smaller width in the first direction than does the first capacitance portion, and the second direction being positive when the first connecting portion is viewed from the first capacitance portion which is adjacent to the first connecting portion, the second extension portion of the second wiring line is located in the positive, second direction from the first extension portion of the first wiring line. In other words, the first wiring line and the second wiring line include respective extension portions extending parallel to each other and extending in a direction that is not parallel to the second direction; the second electrode includes: a first capacitance portion at least partially overlapping the first electrode in a plan view; and a first connecting portion adjacent to the first capacitance portion in the plan view, the first connecting portion having a smaller width in the first direction than does the capacitance portion; and when viewed in the second direction, the first connecting portion and the extension portion of the second wiring line are located on the same side of the capacitance portion and the extension portion of the first wiring line respectively.

According to the first structure, the capacitance of the detection portion formed by the first electrode and the second electrode decreases if the parasitic capacitance between the first wiring line and the second wiring line increases due to an error in aligning the first electrode and the second electrode to attach the first substrate and the second substrate. As a result, initial capacitance value variations can be restrained.

In accordance with a second structure, the electrostatic capacitive touch panel in accordance with the first structure may be configured so as to further include: a plurality of third electrodes provided on the first substrate and extending in the first direction; and a plurality of third wiring lines provided on the first substrate and connected to the plurality of third electrodes, wherein the plurality of third wiring lines each include an extension portion extending parallel to the extension portions of the first wiring line and the second wiring line and extending in the non-parallel direction, and the extension portion of each of the plurality of third wiring lines is separated by a greater distance from the extension portion of the second wiring line than is the extension portion of the first wiring line.

In accordance with a third structure, the electrostatic capacitive touch panel in accordance with the first or second structure may be configured so that the second electrode includes: a plurality of third capacitance portions at least partially overlapping a plurality of third electrodes respectively in the plan view; and a plurality of third connecting portions adjacent to the plurality of third capacitance portions respectively in the plan view, and at least one of the plurality of third connecting portions has a width in the first direction that is smaller than a width of the plurality of third capacitance portions in the first direction and that is larger than a width of the first connecting portion in the first direction.

In accordance with a fourth structure, the electrostatic capacitive touch panel in accordance with any of the first to third structures may be configured so that a plurality of third connecting portions have, in the first direction, a width that increases as moving in the second direction away from the first connecting portion.

In accordance with a fifth structure, the electrostatic capacitive touch panel in accordance with any of the first to fourth structures, may be configured so as to further include: a plurality of fourth electrodes provided on the second substrate and extending in the second direction; and a plurality of fourth wiring lines provided on the second substrate and connected to the plurality of fourth electrodes, wherein the plurality of fourth wiring lines each include an extension portion extending parallel to the extension portions of the first wiring line and the second wiring line and extending in the non-parallel direction, and the extension portion of each of the plurality of fourth wiring lines is separated by a greater distance from the extension portion of the first wiring line than is the extension portion of the second wiring line.

In accordance with a sixth structure, the electrostatic capacitive touch panel in accordance with any of the first to fifth structures may be configured so that the first electrode, the second electrode, and a plurality of third electrodes are disposed in an input area of the first substrate and the second substrate, and the first capacitance portion is disposed on a corner of the input area.

INDUSTRIAL APPLICABILITY

The electrostatic capacitive touch panel in accordance with the present disclosure is suited for use in various fields and for various purposes.

What is claimed is:
1. An electrostatic capacitive touch panel comprising:
a first substrate;
a first electrode provided on the first substrate and extending in a first direction;
a first wiring line provided on the first substrate and connected to the first electrode;
a second substrate provided opposite the first substrate;
a second electrode provided on the second substrate and extending in a second direction that is perpendicular to the first direction;
a second wiring line provided on the second substrate and connected to the second electrode;
a plurality of third electrodes provided on the first substrate and extending in the first direction; and
a plurality of third wiring lines provided on the first substrate and connected to the plurality of third electrodes, wherein
the first wiring line includes a first extension portion,
the second wiring line includes a second extension portion,
the first extension portion and the second extension portion extend parallel to each other and in a non-parallel direction that is not parallel to the second direction,
the second electrode includes:
a first capacitance portion at least partially overlapping the first electrode in a plan view; and
a first connecting portion adjacent, in the second direction, to the first capacitance portion in the plan view, the first connecting portion having a smaller width in the first direction than does the first capacitance portion,
the second direction is positive when the first connecting portion is viewed from the first capacitance portion which is adjacent to the first connecting portion,
the second extension portion of the second wiring line is located in the positive second direction from the first extension portion of the first wiring line,
each of the plurality of third wiring lines includes an extension portion extending parallel to the first and second extension portions and extending in the non-parallel direction, and
the extension portion of each of the plurality of third wiring lines is separated from the second extension portion of the second wiring line by a greater distance than the first extension portion of the first wiring line.

2. The electrostatic capacitive touch panel according to claim 1, wherein
the second electrode further includes:
a plurality of third capacitance portions at least partially overlapping the plurality of third electrodes, respectively, in the plan view; and
a plurality of third connecting portions adjacent to the plurality of third capacitance portions, respectively, in the plan view, and
at least one of the plurality of third connecting portions has a width, in the first direction, that is smaller than a width of the plurality of third capacitance portions in the first direction, and that is larger than a width of the first connecting portion in the first direction.

3. The electrostatic capacitive touch panel according to claim 2, wherein the plurality of third connecting portions has, in the first direction, a width that increases as moving, in the second direction, away from the first connecting portion.

4. An electrostatic capacitive touch panel comprising:
a first substrate;
a first electrode provided on the first substrate and extending in a first direction;
a first wiring line provided on the first substrate and connected to the first electrode;
a second substrate provided opposite the first substrate;
a second electrode provided on the second substrate and extending in a second direction that is perpendicular to the first direction;
a second wiring line provided on the second substrate and connected to the second electrode;
a plurality of fourth electrodes provided on the second substrate and extending in the second direction; and
a plurality of fourth wiring lines provided on the second substrate and connected to the plurality of fourth electrodes, wherein
the first wiring line includes a first extension portion,
the second wiring line includes a second extension portion,
the first extension portion and the second extension portion extend parallel to each other and in a non-parallel direction that is not parallel to the second direction,
the second electrode includes:
 a first capacitance portion at least partially overlapping the first electrode in a plan view; and
 a first connecting portion adjacent, in the second direction, to the first capacitance portion in the plan view, the first connecting portion having a smaller width in the first direction than does the first capacitance portion,
the second direction is positive when the first connecting portion is viewed from the first capacitance portion which is adjacent to the first connecting portion,
the second extension portion of the second wiring line is located in the positive second direction from the first extension portion of the first wiring line,
each of the plurality of fourth wiring lines includes an extension portion extending parallel to the first and second extension portions and extending in the non-parallel direction, and
the extension portion of each of the plurality of fourth wiring lines is separated from the first extension portion of the first wiring line by a greater distance than the second extension portion of the second wiring line.

5. An electrostatic capacitive touch panel comprising:
a first substrate;
a first electrode provided on the first substrate and extending in a first direction;
a first wiring line provided on the first substrate and connected to the first electrode;
a second substrate provided opposite the first substrate;
a second electrode provided on the second substrate and extending in a second direction that is perpendicular to the first direction; and
a second wiring line provided on the second substrate and connected to the second electrode, wherein
the first wiring line includes a first extension portion,
the second wiring line includes a second extension portion,
the first extension portion and the second extension portion extend parallel to each other and in a non-parallel direction that is not parallel to the second direction,
the second electrode includes:
 a first capacitance portion at least partially overlapping the first electrode in a plan view; and
 a first connecting portion adjacent, in the second direction, to the first capacitance portion in the plan view, the first connecting portion having a smaller width in the first direction than does the first capacitance portion,
the second direction is positive when the first connecting portion is viewed from the first capacitance portion which is adjacent to the first connecting portion,
the second extension portion of the second wiring line is located in the positive second direction from the first extension portion of the first wiring line,
the first electrode, the second electrode, and a plurality of third electrodes are disposed in an input area of the first substrate and the second substrate, and
the first capacitance portion is disposed on a corner of the input area.

* * * * *